United States Patent [19]

Winn, Jr. et al.

[11] 4,111,334
[45] Sep. 5, 1978

[54] BALL INJECTOR

[75] Inventors: Fred M. Winn, Jr., Tulsa, Okla.; Monty E. Harris, Agua Dulce, Tex.

[73] Assignee: The Dow Chemical Company, Midland, Mich.

[21] Appl. No.: 739,917

[22] Filed: Nov. 8, 1976

[51] Int. Cl.² .......................................... B65G 29/00
[52] U.S. Cl. ...................................... 221/75; 308/9
[58] Field of Search ............... 221/75, 96; 198/658, 198/672, 673, 724; 308/9; 312/59, 97.1, 197

[56] References Cited

U.S. PATENT DOCUMENTS

| 2,070,115 | 2/1937 | Crane | 308/9 |
|---|---|---|---|
| 2,482,245 | 9/1949 | Childers | 221/75 |
| 3,136,589 | 6/1964 | Richman | 308/9 |
| 3,715,055 | 2/1973 | Kendrick et al. | 221/75 |
| 3,815,490 | 6/1974 | Barney et al. | 198/724 |

FOREIGN PATENT DOCUMENTS 1,294,378 10/1972 United Kingdom ............ 308/9

Primary Examiner—Robert B. Reeves
Assistant Examiner—Fred A. Silverberg
Attorney, Agent, or Firm—Earl D. Ayers

[57] ABSTRACT

This invention relates to an apparatus for dispensing ball-like objects and more particularly to an apparatus with a grooved longitudinally disposed member and a surrounding sleeve having a helical inwardly extending rib therein rotatably mounted around the sleeve, the objects being dispensed by the rib pushing them along the groove and out of the apparatus as the sleeve is rotated.

8 Claims, 5 Drawing Figures

4,111,334

BALL INJECTOR

BACKGROUND OF THE INVENTION

This invention relates to ball injecting apparatus for use in earth wells. In the completion of oil and gas wells, it is common practice to cement casing into the well and perforate it opposite the producing formation, such perforations being for the purpose of admitting oil and/or gas into the casing and thence to the surface of the well.

Subsequent to perforating the casing, the formation may be treated by pumping acid or fracturing fluid down the casing and into the formation via the perforations. Such treatment opens and/or enlarges drainage channels in the formation so as to enhance the producing ability of the well.

As is well-known to those skilled in the art, the treating fluid enters those zones of the formation having the highest permeability while the zones of the formation having lower permeabilities, and therefore requiring treatment the most, receive very little or none. The remedy to this problem was disclosed in U.S. Pat. No. 2,754,910 wherein it was proposed to temporarily block off those perforations leading to the higher permeable zones so as to divert the treating fluid into the lower permeable zones. The blocking agents used are objects having a size slightly larger than the perforations and a density approximately equal to the treating fluid. These objects which may be rounded and referred to as balls, are dispensed into the treating fluid and carried thereby to the perforations through which most or all of the fluid flows at the lowest pressure. The fluid pressure holds the objects or balls in sealing position against the perforations so that the treating fluid is diverted into the lower permeable zones.

Workers have attempted to develop dispensers capable of being employed in high pressure environments and where the treating fluid is heavily laden with abrasive such as sand, glass beads, and the like. Further problems acknowledged by those skilled in the art include unintentionally dispensing more than the desired number of balls and a lack of a reliable mechanical means of forcing the balls into the flow stream.

One ball injector device which is reasonably satisfactory in alleviating the above-mentioned problems is described and claimed in U.S. Pat. No. 3,715,055.

OBJECTS OF THE INVENTION

A principal object of this invention is to provide an improved ball injector device for use in earth well treating operations.

Another object of this invention is to provide an improved, easy to use ball injector device for use in earth well treating operations.

A further object of this invention is to provide an improved, reliable, self-cleaning ball injector for use in earth well treating operations.

STATEMENT OF INVENTION

In accordance with this invention, there is provided ball injector apparatus including, within a housing, a centrally disposed grooved member surrounded by a rotatable sleeve having at least one inwardly extending helical rib therein, means for introducing balls into the space between the helical rib(s) and the groove(s), means for rotating the sleeve to advance the balls downwardly, and means for coupling the housing to flow path means connected to an earth well whereby balls are metered into said flow path.

BRIEF DESCRIPTION OF THE DRAWING

The invention, as well as additional objects and advantages thereof, will best be understood when the following detailed description is read in connection with the accompanying drawing, in which.

DETAILED DESCRIPTION OF THE DRAWING

Figure 1:
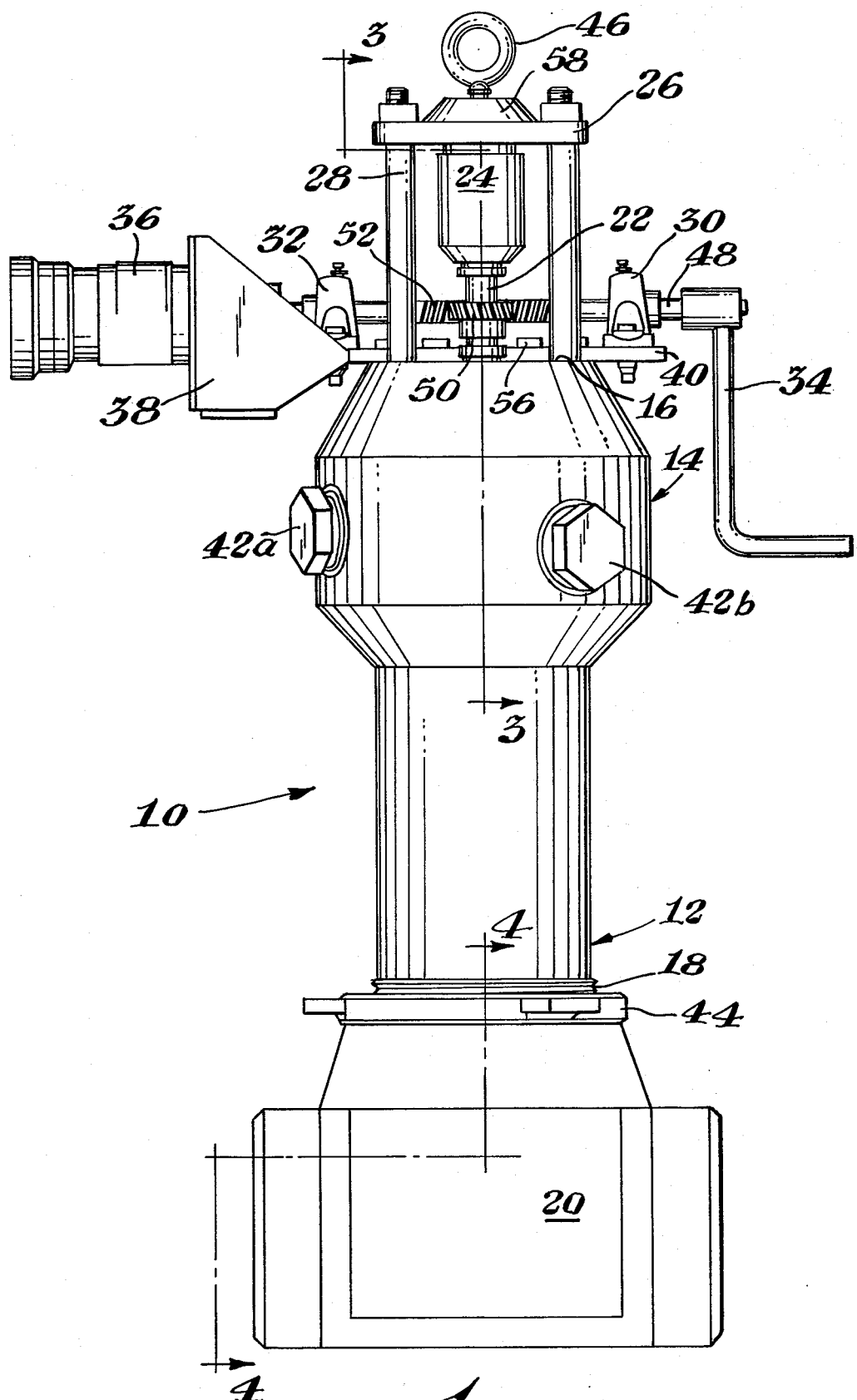
FIG. 1 is a side elevational view of apparatus in accordance with this invention.
Figure 2:
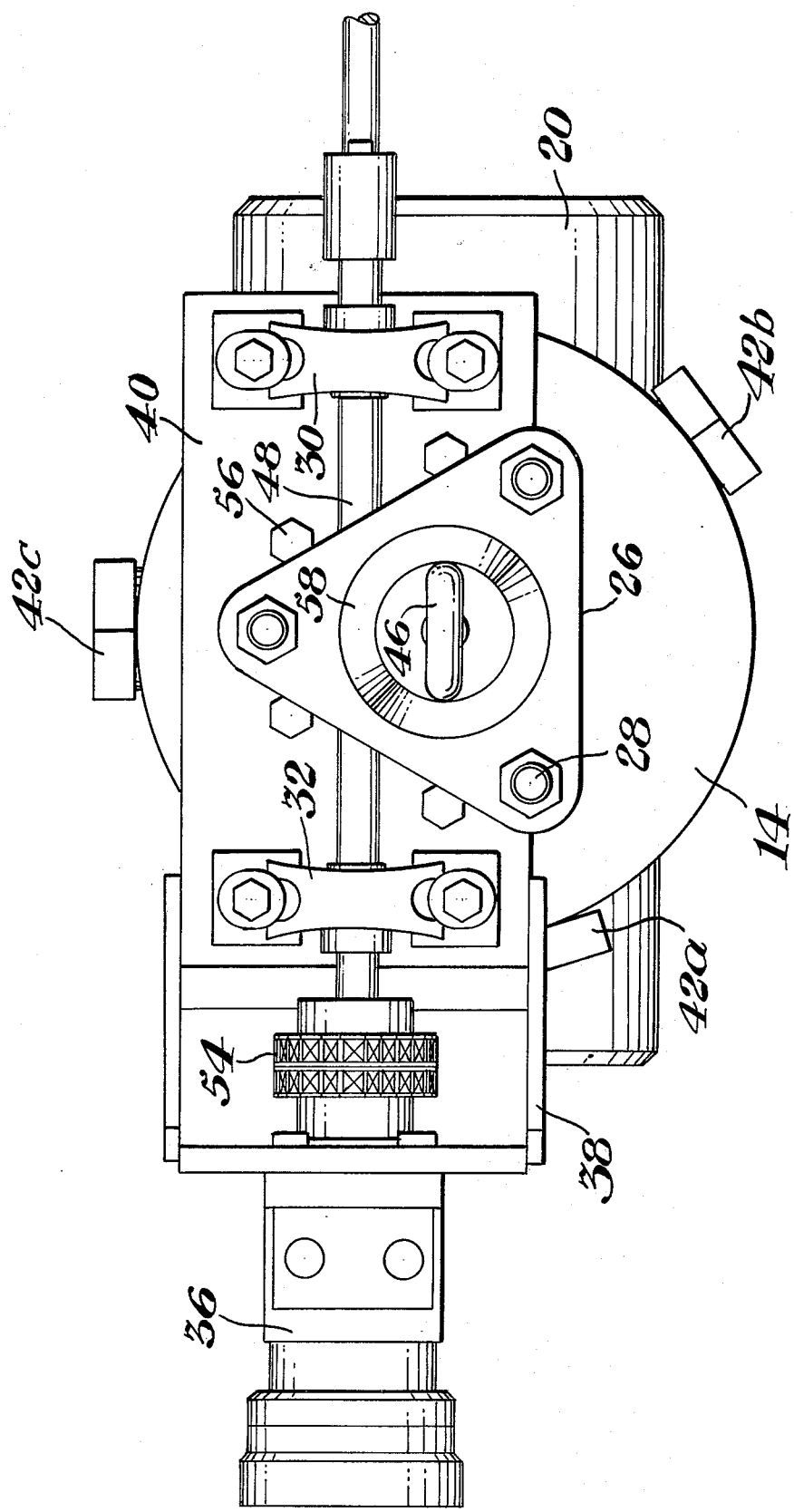
FIG. 2 is a top plan view of apparatus in accordance with this invention.

Referring to the drawing, there is shown apparatus, indicated generally by the numeral 10, for injecting ball-like elements into tubing (not shown) which is coupled to the base part 20 of the apparatus. A tubular housing part, indicated generally by the numeral 12 has its lower threaded end 18 attached to the base part 20 by quick coupler 44.

The upper end part 14 of the housing may be integral with the tubular housing part 12 as shown or may be made as a separate element and rigidly coupled to the part 12. The end part 14 is of substantially larger outer diameter than the diameter of the housing part 12.

An axial bore 66 extends from near the upper end of the housing part 14 through the housing part 12, communicating into the passageway 114 in the base part 20 through the bore 102, its tapered part 116, and the counterbored part 104 in the top of the part 20.

An elongated tubular member 72 having a closed upper end 70 is disposed in the bore 66 with its upper end 70 fixedly coupled to the shaft 22 which extends through the bore 62. The upper end of the bore 62 is counterbored. Packing 64 in the counterbored part is compressed by the threaded bushing 60 to provide a seal around the shaft 22.

The shaft 22 extends above the part 14, terminating in a hydraulic pressure balance assembly 24. The upper portion of shaft 22 is rotably sealed in assembly 24 by packing 64' and threaded bushing 60'. Assembly 24 bears against thrust bearing 140 which in turn bears against the plate 26. Plate 26 is held in position by bolts within spacer sleeves 28 fastened into the upper part 14 of housing 12.

Figure 3:
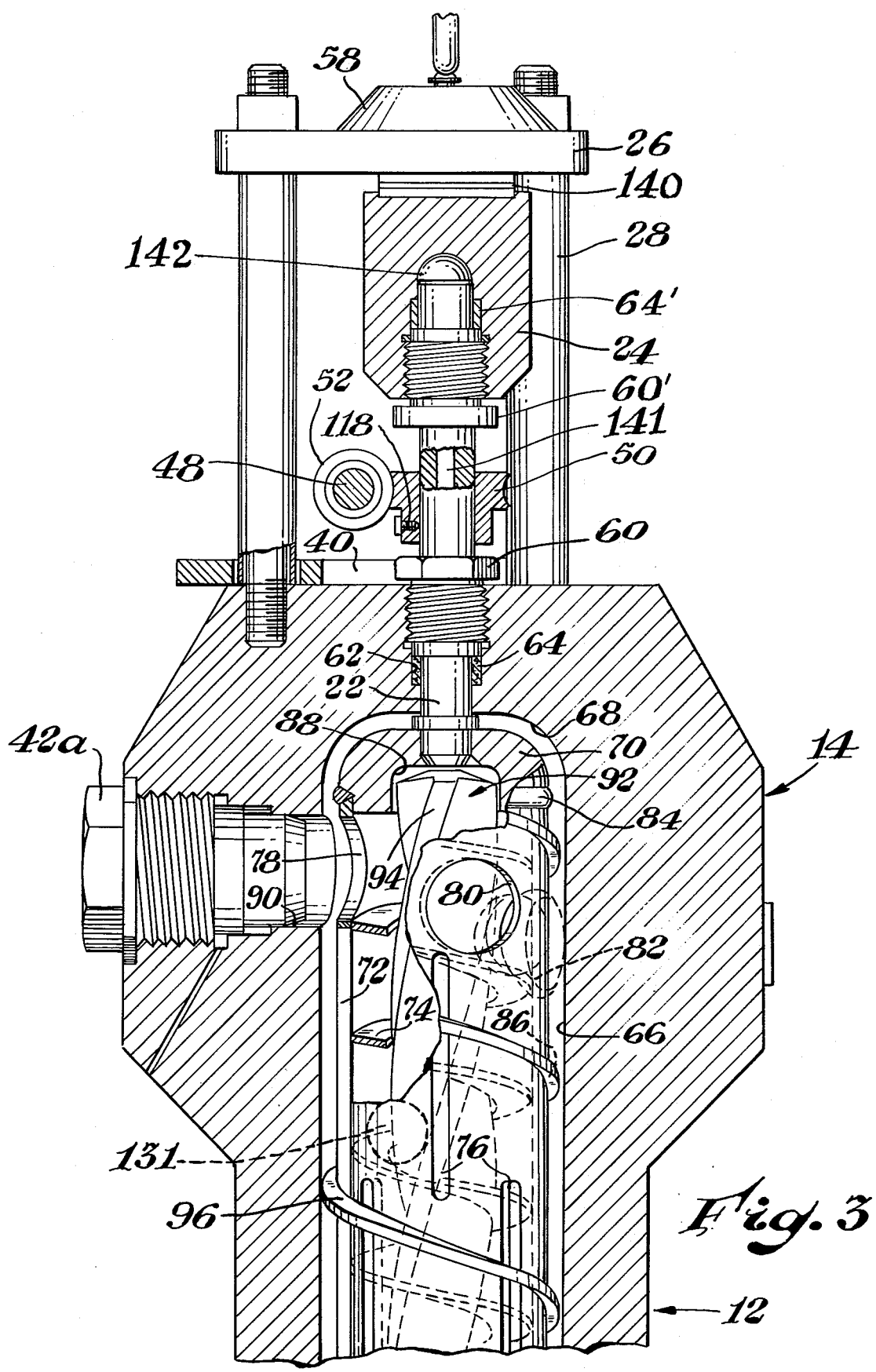
FIG. 3 is a sectional view along the line 3—3 of FIG. 1.
Figure 4:
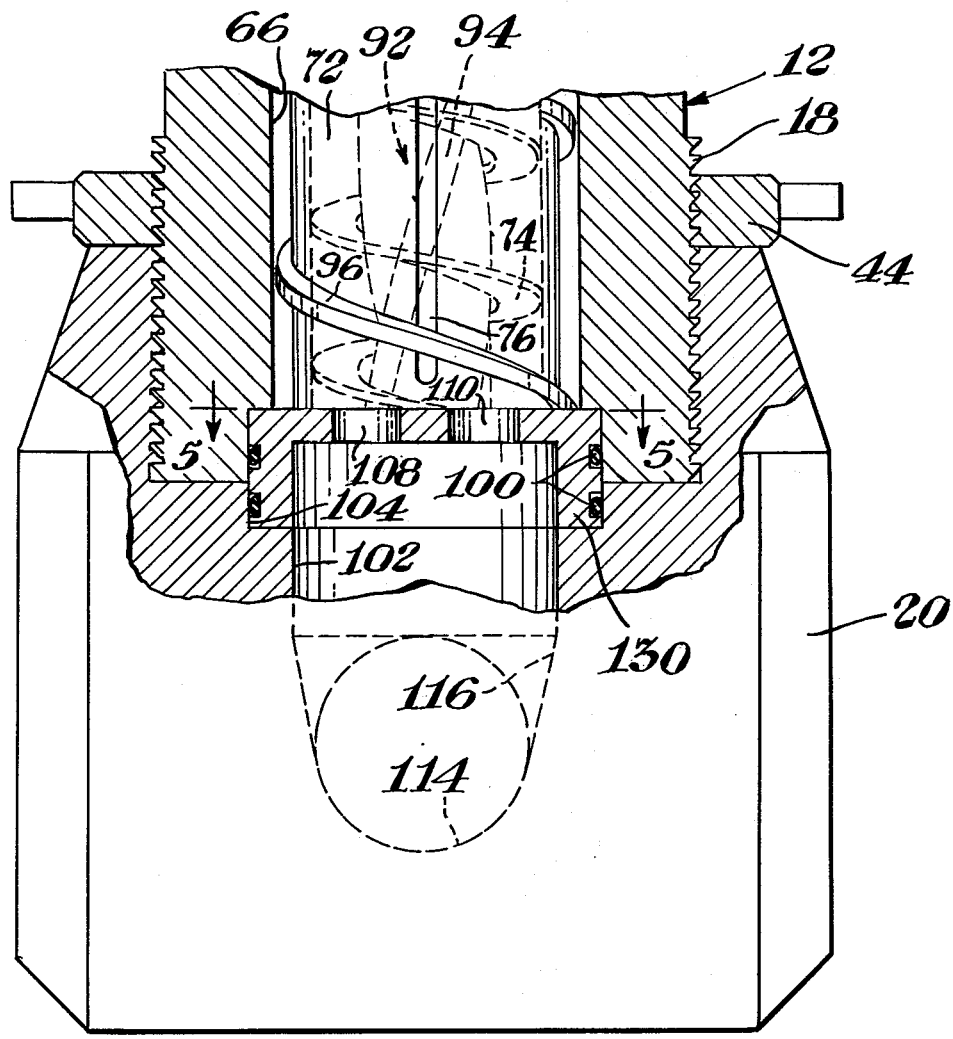
FIG. 4 is a sectional view along the line 4—4 of FIG. 1.

Preferably, the apparatus is constructed so that tubular member 72 and components rigidly attached thereto are in a state of substantial hydraulic balance with respect to housing 12 when in actual operation. When so constructed, minimal rotating torque is required to rotate shaft 22 and, in turn, tubular member 72. One embodiment for such a construction is shown in FIG. 3. A chamber 142 is provided in assembly 24, and the upper end of shaft 22 terminates in said chamber 142. Shaft 22 is provided with a hollow longitudinal passage 141 which provides fluid communication between the space within sleeve 72 and the chamber 142. Such a construction permits the hydraulic forces exerted on the shaft 22 by the well pressure to be in balance, leaving only the weight of the shaft 22 and sleeve 72 (including rigidly attached components) and the friction imparted at packings 64 and 64' to resist turning torque. In actual practice, the thrust bearing 140 will not turn, as the full hydraulic force on the upper surface of chamber 142 is exerted as an unbalanced thrust against bearing 140.

Lift ring attaching means 58 to which ring 46 is coupled, is secured to the top of the plate 26.

A gear sleeve 50 surrounds the shaft 22 above the part 14 and is fixedly coupled to the shaft by one or more set screws 118.

A worm element 52, coupled to the shaft 48, engages the gear sleeve 50.

The shaft 48 is carried by bearing assemblies 30, 32, and is coupled at one end, through the coupler 54, to a hydraulic motor 36 supported by the mount 38 which is coupled to the plate 40.

The other end of the shaft 48 is coupled to the hand crank 34.

The elongated sleeve 72 extends downwardly to, or almost to, the base part 130 for the stationary central shaft 92, to be described later.

An inwardly extending spirally disposed strip 74 extends from top to bottom of the sleeve 72 and is secured to the inner wall surface of the sleeve 72.

An outwardly extending spirally disposed strip 86 extends from top to bottom of the sleeve 72 and is attached to the outer wall surface of the sleeve. The outer edge of the strip 86 fits loosely within the bore 66.

A plurality of narrow, elongated slots 76 extend through the wall of the sleeve 72 along its length.

A plurality of bores 90 extend through the upper part 14 and communicate with the bore 66. The bores 90 are equi-spaced around the circumference of the bore 66 and are displaced downwardly from each other.

A similar array of bores 78, 80, 82 extends through the wall of the sleeve 72 whereby, when the sleeve 72's rotational position is proper, the bores 78, 80, 82 each align with one of the bores 90.

The bores 90 are closed with threaded plugs 42a, 42b, 42c.

The central shaft 92 extends upwardly from its base part 130 to a point beyond the bore 78 in the sleeve 72, fitting loosely within the bore 88 in the part 70.

The shaft 92 is coaxial with respect to the sleeve 72 and has three helical ribs 94 extending from top to bottom along its length.

The base part 130 is an outwardly extending flanged member which fits closely within the counterbored part 104 and is sealed by seals 100 to prevent the passage of fluids around the edge of the part 130.

Figure 5:
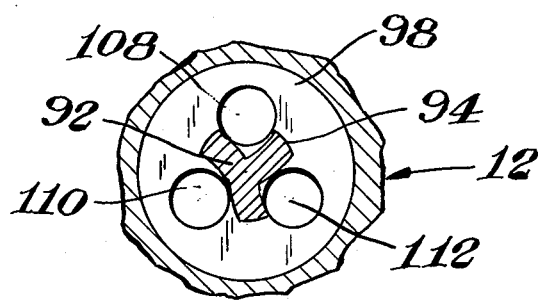
FIG. 5 is a sectional view along the line 5—5 of FIG. 4.

The base part 130 has an array of three bores 108, 110, 112, as shown in FIG. 5, one bore of the array being disposed closely adjacent to and between adjacent ribs 94 of the shaft 92. The bores 108, 110, 112 each communicate with the bore 102 whose tapered part 116 extends into the transversely disposed bore 114 which is coupled to tubular means (not shown) communicating with an earth well, for example.

Operation

In operation, with the apparatus 10 coupled to an earth well whereby a pumpable treating agent passes through the bore 114, ball objects 131 are dispensed through the bores 108, 110, 112 on rotation of the sleeve 72.

Rotation of the sleeve 72 is accomplished by means of the hand crank 34 or by the drive motor 36 which is gear coupled to the sleeve shaft 22 through the shaft 48.

The apparatus 10 usually is loaded with the required number of balls 131 before the apparatus is coupled to the well.

To load the apparatus 10, the plugs 42a, 42b, 42c are removed and the shaft 72 rotated until the bores 78, 80, 82 are aligned with the bores 90 from which the plugs 42a, 42b and 42c have been removed.

A ball is inserted through each bore 90, through its bore 78, 80 or 82 in the sleeve 72 and rests in the pocket or space defined between two adjacent ribs 94 of the shaft 92 and between two turns of the inwardly extending spiral of the sleeve 72.

After three balls have been inserted, the shaft is rotated one turn to carry the balls downwardly along the spiral 74 to make room for another three balls to be inserted through the bores 90. The capacity of the apparatus is three times the number of loops within the shaft made by the spiral 74.

After the required number of balls have been loaded into the apparatus, the sleeve is rotated until, on further rotation of one third turn of the sleeve, one ball 131 would be freed to pass through one of the bores 108, 110, 112 and into the tubular passage 114 to be carried along with the treating agent being pumped into the well.

The rotation of the sleeve 72 provides positive displacement of balls into the treating fluid through the bores 108, 110, 112 and the bore 102.

If treating agent containing particulate material is used in the well treatment, the slots 76 and outer rib 96 provide means for circulating treating agent and forcing downwardly material which might tend to settle on the wall of the bore 66 and possibly jam the rotation of the sleeve 72.

The balls being injected act as a centering mechanism for the sleeve 72.

The balls 131 are sized to fit loosely within the "pockets" in which they are disposed between the non-rotating shaft 92 and the sleeve 72, and to fall freely through each bore 108, 110, 112.

The rate of dispensing balls from the apparatus 10 is a function of the speed of rotation of the shaft 22. Balls have been dispensed at a rate of 3 to 20 per minute at treating pressures of up to 20,000 pounds per square inch.

What is claimed is:

1. Apparatus for dispensing ball-like objects which comprises:
   (a) a housing including an axially aligned tubular bore;
   (b) a cylindrical rotatable tubular sleeve having an inwardly extending spiral element extending from one end of said sleeve to the other;
   (c) a non-rotatable shaft having at least one helical rib, an upper end and a base end, said shaft being coaxially mounted within said sleeve to form a plurality of separate object receiving compartments;
   (d) means including an array of sealable bores disposed around the circumference of said housing, said sealable bores extending through said housing and into said tubular bore and communicating with an alignable array of bores disposed in the upper end part of said rotatable tubular sleeve when said rotatable sleeve is in a predetermined position for introducing ball like objects into said compartments, and removable plug elements for sealing said bores;

(e) means for discharging said ball like objects from said compartments, and;
(f) means for rotating said sleeve whereby said compartments are successively aligned with said means for discharging said ball like objects from said compartments.

2. Apparatus in accordance with claim 1, wherein said means for rotating said sleeve includes a shaft extending through said housing and having gear drive means coupled thereto.

3. Apparatus in accordance with claim 1, wherein said non-rotatable shaft has three helical ribs symmetrically disposed along its length.

4. Apparatus in accordance with claim 1, wherein said sleeve also has a spiral rib extending substantially from top to bottom along its outer surface.

5. Apparatus in accordance with claim 1, wherein said means for discharging said ball like objects comprises an array of bores extending through the base end of said shaft.

6. Apparatus in accordance with claim 5, wherein each bore lies between and adjacent to a pair of helical ribs of said shaft.

7. Apparatus in accordance with claim 1, wherein said sleeve fits loosely within said tubular bore in said housing.

8. Apparatus in accordance with claim 1, wherein means are provided to maintain said sleeve in a state of substantial hydraulic balance with respect to said housing when said means for discharging is in fluid communication with a fluid at an elevated pressure.

* * * * *